Figure 1:
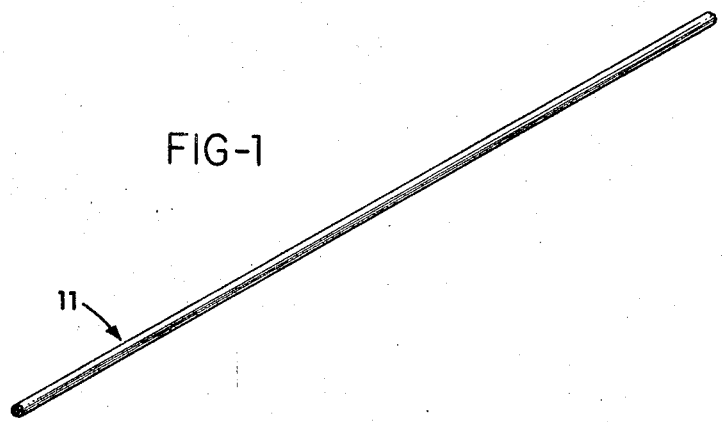

Feb. 7, 1967 G. E. CLAUSSEN 3,303,323
WELDING ELECTRODES
Filed Aug. 26, 1965

11

12
13

INVENTOR.
GERARD E. CLAUSSEN
BY
Marechal, Biebel, French & Bugg
ATTORNEYS

United States Patent Office 3,303,323
Patented Feb. 7, 1967

3,303,323
WELDING ELECTRODES
Gerard E. Claussen, Troy, Ohio, assignor to Hobart Brothers Company, Troy, Ohio, a corporation of Ohio
Filed Aug. 26, 1965, Ser. No. 486,264
8 Claims. (Cl. 219—137)

This application is a continuation-in-part of application Serial No. 303,005, filed August 19, 1963, now abandoned.

This invention relates to the art of electric welding and specifically to welding electrodes to be used in welding 2¼% chromium-1% molybdenum steel alloys.

The principal object of the invention is the provision of electrodes which may be used with a gas shield of either pure carbon dioxide, a mixture of carbon dioxide and argon, or a mixture of carbon dioxide and helium, pure argon, pure helium, argon with a small percentage of oxygen, or helium with a small percentage of oxygen, for welding chromium-molybdenum alloys of approximately the specified chromium and molybdenum content.

Another object of the invention is to provide such an electrode in the form of a hollow sheath member incorporating the desired alloying and deoxidizing agents as a core within the sheath, and in some cases also including fluxing ingredients.

A further object of the invention is the provision of cored electrodes which, when melted, form a weld having compositions of the chromium-molybdenum alloy steel being welded.

Other objects, advantages and features of the invention will be apparent from the following description, the accompanying drawing, and the appended claims.

In the drawing—

Figure 2:
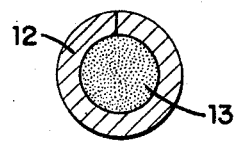

FIG. 1 is a showing in perspective of an electrode formed according to the invention; and FIG. 2 is a view in cross-section of the electrode of FIG. 1 shown on an enlarged scale.

The electrode disclosed herein is of value in welding an alloy steel having a relatively low content of carbon and approximately 2.25% chromium and approximately 1% molybdenum. Such a low carbon chromium alloy steel, for example, is a steel alloy known as A335-55T, Grade B22 for which the ASTM specifications are 0.15% carbon, maximum; 0.30% to 0.60% Mn; 0.50% maximum Si; 1.90% to 2.60% Cr; and 0.87% to 1.13% Mo. The cored electrodes described herein are useful in welding other chromium-molybdenum alloys wherein several of the above constituents are varied reasonably in order to secure various desired characteristics of the steel, while the chromium and molybdenum content are held at approximately 2.25% and 1.0% respectively. The compositions of such steels are set forth in the ASTM Standards, 1961, published by the American Society for Testing and Materials.

The cored electrode 11 disclosed in FIG. 1 has a sheath 12 which encloses a core 13.

The sheath 12 disclosed in illustration of the invention is preferably formed from a strip of mild steel having the width of about 0.380 inch and having a thickness of about 0.030 inch. This strip is bent or otherwise formed into a hollow tube, preferably circular, having an external diameter of 3/32 inch (or .09375 inch). This tube may have an internal diameter of about 0.045 inch so that the core has a diameter of approximately 0.045 inch. Other sized strips may obviously be used in many different embodiments to form tubes having different diameters. For example, 0.512 inch wide strips have been used to form tubes having diameters of 0.1875 inch. Another method is to form the tubes of a larger size than required. Then, after forming the relatively large sized tubes, they may be drawn to smaller diameters if desired.

If desired, the thickness of the mild steel strip may be reduced, and the amount of iron powder in the core (as set out in the example below) increased, or in the alternative, the thickness of the strip may be increased and the amount of iron powder decreased.

The composition of the mild steel strip disclosed in the illustration is from 0.03 to 0.10% carbon, 0.30 to 0.60 manganese, from 0.0% to 0.04% phosphorus, and from 0.0 to 0.05 sulfur, and approximately 0.01% silicon. Any of these elements can be varied reasonably, but the above is an ideal analysis.

The sheath specified above was filled during the manufacturing and forming process with the core material, and when completely filled and closed, the cored electrode consisted of a round tube and the core. The complete electrode material (i.e., the tube and core) consisted of approximately 81% sheath and 19% core. In one illustrative embodiment, the following formula of the materials forming the core was used, all percentages being by weight:

| | Percent |
|---|---|
| Low carbon ferrochromium | 20.4 |
| Ferromolybdenum | 8.8 |
| Manganese | 1.5 |
| Ferrosilicon | 4.4 |
| Iron powder | 64.9 |

The ranges of composition of the core of electrodes provided for the welding of 2¼% chromium and 1% molybdenum steel are:

| | Percent |
|---|---|
| Low carbon ferrochromium | 10 to 45 |
| Ferromolybdenum | 5 to 17 |
| Manganese | 0.0 to 16 |
| Ferrosilicon | 0.0 to 23 |
| Iron powder | 0.0 to 85 |

The composition of the core of the electrode is varied for each type of arc shielding in order to offset undesirable loss of alloying elements to the flux or gas or any gain of Mn or Si from a flux. Where the electrode is intended for use with $CO_2$ shielding the core should contain about 1.5% manganese, and about 2.5% silicon. A considerable part of the manganese and silicon is oxidized and lost during $CO_2$ welding. The reasons for maintaining the Si and Mn at these relatively high levels in the core are (1) the high content of these metals improves the flow of the weld metal in narrow groove joints as for example in welding pipes and (2) the presence of silicon protects chromium from oxidation and loss. If, on the other hand, the electrode is intended for welding with an argon-oxygen or an argon-carbon dioxide mixture, the percentage of Mn and Si in the core may be reduced, because these gases are less oxidizing than carbon dioxide alone. If the electrode is to be used for submerged arc welding with a flux that contributes manganese and silicon to the weld metal, no manganese or silicon need be added to the core.

The range of composition of the deposited metal from the above compositions expressed in percentages by weight when deposited from an electrode having a low carbon sheath are:

| | Percent |
|---|---|
| Carbon | 0.0 to 0.12 |
| Chromium | 2.0 to 2.50 |
| Molybdenum | 0.90 to 1.20 |
| Manganese | 0.0 to 0.90 |
| Silicon | 0.0 to 1.00 |

A welding from the above-described electrode was deposited at 480 amperes, 29 volts; direct current, reverse polarity on 12 inch pipe with 20 cubic feet per hour of carbon dioxide as shielding gas. The same materials have been used with submerged arc welding and using other shielding gases such as 75% argon and 25% $CO_2$, pure helium, pure argon, argon and oxygen, and helium and oxygen. The resulting weld metal was substantially identical with the steel being welded and met the specification of the the type weld metal.

In order to determine tensile properties of welds made using the electrode described above, a weld was deposited to weld butt joints in ¾ inch plates. The weld was deposited in seven layers at 400 amperes direct current, reverse polarity, 29 volts with 25 cubic feet per hour of carbon dioxide as shielding gas. The interpass temperature was 300° F. The weld was stress relief heat treated at 1275° F. for one hour. The edges of the plates were clad with weld metal from the cored electrode. The root gap was ½ inch and the included angle of the beveled joint was 45°. The specimens were cut from the butt joint of the plates and the following tensile properties were determined:

| | |
|---|---|
| Yield strength, p.s.i. | 78,000 |
| Tensile strength, p.s.i. | 92,000 |
| Elongation percent in 2" | 20 |
| Reduction of area, percent | 53 |

The compositions of the core may be varied by replacing ferrochromium with ferrovanadium to produce the molybdenumvanadium grades of high-creep strength steels.

On the other hand, the ferrochromium may be replaced with chrome ore. In that event additional ferrosilicon is added to the core to reduce the chrome ore to metal.

In making an electrode for alloys of the nature referred to herein (i.e., for 2¼% chromium-1% molybdenum steel alloys), the core at times includes in addition to the alloying elements specified above, deoxidizing and fluxing ingredients where required.

An example of an electrode of this type is as follows. A sheath is formed of a low carbon steel strip having approximately 0.005% to 0.08% carbon, 0.10 to 0.60% manganese, from 0.005 to 0.035% phosphorus, from 0.010 to 0.045% sulfur, and about 0.01% silicon. The proportions can be reasonably varied, keeping in mind that a low carbon content is desired.

The core material of this electrode is ideally formed of the following ingredients, in percentage by weight of the core:

| | Percent |
|---|---|
| Manganese | 16.0 |
| Ferrosilicon | 14.0 |
| Ferromolybdenum | 11.0 |
| Ferrochromium | 26.0 |
| Rutile | 18.0 |
| Magnetite | 15.0 |

The rutile and magnetite are natural sources of titanium dioxide ($TiO_2$) and iron oxide ($Fe_3O_4$). These ingredients are present as flux, and they may be used within the range of 33 to 3% rutile, and 0 to 30% magnetite. It is also possible to use ilmenite in place of all or part of the rutile and megnetite, since ilmenite is a natural source of titanium dioxide and iron oxide. The alloying and deoxidizing ingredients can be varied within the ranges previously stated in the example using iron powder as the additional ingredient.

As stated above, the amount of iron powder in the core of the electrode may be varied through wide ranges as for example from 0.0 to 82%. However, the remaining elements and compounds will usually, in such cases, consist especially of approximately the following percentages by weight:

| | Percent |
|---|---|
| Low carbon ferrochromium | 58.1 |
| Ferromolybdenum | 25.1 |
| Manganese | 4.2 |
| Ferrosilicon | 12.6 |

While the specific forms of articles and specific compositions of matter, herein described, constitute preferred embodiments of the invention, it is to be understood that the invention is not limited to these precise forms and compositions and that changes may be made without departing from the scope of the invention which is defined in the appended claims.

What is claimed is:

1. A bare cored electrode for welding a 2.25% chromium-1% molybdenum alloy steel;
   the electrode comprising a sheath formed from a strip of low carbon steel folded substantially in the shape of a tube and comprising approximately 81% of the total weight of the electrode;
   and a core contained within said sheath, said core containing alloying and deoxidizing agents in the amounts corresponding to the following percentages by weight of the core:

| | Percent |
|---|---|
| Low carbon ferrochromium | 10 to 45 |
| Ferromolybdenum | 5 to 17 |
| Manganese | 0 to 16 |
| Ferrosilicon | 0 to 23 |
| Iron powder | 0 to 85 |

2. A bare cored electrode as defined in claim 1 wherein said sheath is formed from a strip of steel containing the following materials:

| | Percent |
|---|---|
| Carbon | 0.03 to 0.10 |
| Manganese | 0.30 to 0.60 |
| Phosphorus | 0.0 to 0.04 |
| Sulphur | 0.0 to 0.05 | with iron forming the remainder of the sheath.

3. A bare cored electrode as defined in claim 1 wherein the core contains, in addition to said listed ingredients, approximately equal amounts of rutile and magnetite as flux agents.

4. A bare cored electrode for welding a 2.25% chromium-1% molybdennum alloy steel;
   the electrode comprising a sheath formed from a strip of mild steel folded substantially in the shape of a tube, and a core contained within said sheath;
   the sheath being formed from a strip of a low carbon steel; and
   the core containing as essential ingredients alloying and deoxidizing agents in amounts corresponding to the following percentages by weight of the core:

| | Percent |
|---|---|
| Low carbon ferrochromium | 20.4 |
| Ferromolybdenum | 8.8 |
| Manganese | 1.5 |
| Ferrosilicon | 4.4 |
| Iron powder | 64.9 |

5. A bare cored electrode for welding a 2.25% chromium-1% molybdenum alloy steel;
   the electrode comprising a sheath formed from a strip of mild steel folded substantially in the shape of a tube, and a core contained within said sheath;
   the sheath being formed from a strip of a low carbon steel; and
   the core containing as essential ingredients alloying and deoxidizing agents in amounts corresponding to the following percentages by weight of the core:

| | Percent |
|---|---|
| Manganese | 16.0 |
| Ferrosilicon | 14.0 |
| Ferromolybdenum | 11.0 |
| Ferrochromium | 26.0 |
| Rutile | 18.0 |
| Magnetite | 15.0 |

6. A process of welding a 2.25% chromium-1% molybdenum alloy steel being the work to be welded which comprises:

applying a bare cored electrode in close proximity to the portion of the work to be welded, said electrode having a sheath consisting of the following materials:

| | Percent |
|---|---|
| Carbon | 0.03 to 0.10 |
| Manganese | 0.30 to 0.60 |
| Phosphorus | 0.0 to 0.04 |
| Sulphur | 0.0 to 0.05 |
| Silicon | Approximately 0.5 | and the remainder being iron;

said sheath enclosing a core comprising approximately 19% of the total weight of the electrode, said core containing:

| | Percent |
|---|---|
| Low carbon ferrochromium | 10 to 45 |
| Ferromolybdenum | 5 to 17 |
| Manganese | 0 to 16 |
| Ferrosilicon | 0 to 23 |
| Iron powder | 0 to 85 | providing a gas shield around the point of application of the electrode to the work, said shield being formed of a gas selected from the group consisting of pure carbon dioxide, pure argon, pure helium, a mixture of argon and carbon dioxide, a mixture of helium and carbon dioxide, a mixture of argon and oxygen, and a mixture of helium and oxygen;

passing a welding arc producing electric current through said electrode and between said electrode and said work to melt the sheath and the enclosed core at the end of the electrode proximate to the work and to deposit the metal therefrom upon the work; and relatively moving said electrode and the work to advance the weld on the work.

7. A process of welding a 2.25% chromium-1% molybdenum alloy steel including less than 0.15% carbon, between 1.90% and 2.6% chromium, 0.87% to 1.13% molybdenum, 0.30% to 0.60% manganese, less than 0.50% silicon, and the remainder iron, the process comprising the steps of:

applying a bare cored electrode in close proximity to the portion of the work to be welded, said electrode having a sheath comprising:

| | Percent |
|---|---|
| Carbon | 0.03 to 0.10 |
| Manganese | 0.30 to 0.60 |
| Phosphorus | 0.0 to 0.04 |
| Sulphur | 0.0 to 0.05 |
| Silicon | Approximately 0.01 | and the remainder being iron;

said sheath enclosing a core consisting of:

| | Percent |
|---|---|
| Manganese | 16.0 |
| Ferrosilicon | 14.0 |
| Ferromolybdenum | 11.0 |
| Ferrochromium | 26.0 |
| Rutile | 18.0 |
| Magnetite | 15.0 | providing a gas shield around the point of application of the electrode to the work, said shield being formed of a gas selected from the group consisting of pure carbon dioxide, pure argon, pure helium, a mixture of argon and carbon dioxide, a mixture of helium and carbon dioxide, a mixture of argon and oxygen, and a mixture of helium and oxygen;

passing a welding arc producing electric current through said electrode and between said electrode and said work to melt the sheath and the enclosed core at the end of the electrode proximate to the work and to deposit the metal therefrom upon the work; and relatively moving said electrode and the work to advance the weld on the work.

8. A process of welding a 2.25% chromium-1% molybdenum alloy steel including less than 0.15% carbon, between 1.90% and 2.6% chromium, 0.87% to 1.13% molybdenum, 0.30% to 0.60% manganese, less than 0.50% silicon, and the remainder iron, the process comprising the steps of:

applying a bare cored electrode in close proximity to the portion of the work to be welded, said electrode having a sheath comprising:

| | Percent |
|---|---|
| Carbon | 0.03 to 0.10 |
| Manganese | 0.30 to 0.60 |
| Phosphorus | 0.0 to 0.04 |
| Sulphur | 0.0 to 0.05 |
| Silicon | Approximately 0.01 | and the remainder being iron;

said sheath enclosing a core consisting of:

| | Percent |
|---|---|
| Low carbon ferrochromium | 20.4 |
| Ferromolybdenum | 8.8 |
| Manganese | 1.5 |
| Ferrosilicon | 4.4 |
| Iron powder | 64.9 | providing a gas shield around the point of application of the electrode to the work, said shield being formed of a gas selected from the group consisting of pure carbon dioxide, pure argon, pure helium, a mixture of argon and carbon dioxide, a mixture of helium and carbon dioxide, a mixture of argon and oxygen, and a mixture of helium and oxygen;

passing a welding arc producing electric current through said electrode and between said electrode and said work to melt the sheath and the enclosed core at the end of the electrode proximate to the work and to deposit the metal therefrom upon the work; and relatively moving said electrode and the work to advance the weld on the work.

References Cited by the Examiner

UNITED STATES PATENTS

| | | | |
|---|---|---|---|
| 2,291,482 | 7/1942 | McLott | 219—146 |
| 2,408,620 | 10/1946 | Friedlander | 219—146 |
| 2,990,301 | 6/1961 | Clemens | 117—207 |
| 3,101,405 | 8/1963 | Wilcox | 219—146 |
| 3,175,074 | 3/1965 | Culbertson | 219—146 |
| 3,221,136 | 11/1965 | Freeth et al. | 219—146 |

JOSEPH V. TRUHE, *Primary Examiner.*